(12) United States Patent
Matsuda et al.

(10) Patent No.: US 10,687,677 B2
(45) Date of Patent: Jun. 23, 2020

(54) TOILET SYSTEM

(71) Applicant: LIXIL CORPORATION, Tokyo (JP)

(72) Inventors: Hiroshi Matsuda, Tokyo (JP); Naohisa Oota, Tokyo (JP)

(73) Assignee: LIXIL CORPORATION, Tokyo (JP)

( * ) Notice: Subject to any disclaimer, the term of this patent is extended or adjusted under 35 U.S.C. 154(b) by 0 days.

(21) Appl. No.: 16/076,534

(22) PCT Filed: Mar. 24, 2017

(86) PCT No.: PCT/JP2017/011979
§ 371 (c)(1),
(2) Date: Aug. 8, 2018

(87) PCT Pub. No.: WO2017/164360
PCT Pub. Date: Sep. 28, 2017

(65) Prior Publication Data
US 2019/0038090 A1    Feb. 7, 2019

(30) Foreign Application Priority Data

Mar. 25, 2016    (JP) .................................. 2016-061734

(51) Int. Cl.
*A47K 13/30*   (2006.01)
*E03D 11/02*   (2006.01)
*H02J 50/70*   (2016.01)
*H02J 50/10*   (2016.01)
*H02J 7/02*    (2016.01)
*H02J 7/00*    (2006.01)
(Continued)

(52) U.S. Cl.
CPC .............. *A47K 13/30* (2013.01); *E03D 11/02* (2013.01); *H02J 5/005* (2013.01); *H02J 7/00* (2013.01); *H02J 7/025* (2013.01); *H02J 50/10* (2016.02); *H02J 50/12* (2016.02); *H02J 50/70* (2016.02)

(58) Field of Classification Search
CPC ...................................................... H02J 50/12
See application file for complete search history.

(56) References Cited

U.S. PATENT DOCUMENTS

2003/0025601 A1    2/2003  Gruteser et al.
2008/0271231 A1*  11/2008  Stauber .................. A47K 13/10
                                                              4/246.1
(Continued)

FOREIGN PATENT DOCUMENTS

JP    H05176867 A    7/1993
JP    2012-075304 A  4/2012
JP    2012-191678 A  10/2012
(Continued)

*Primary Examiner* — Daniel J Cavallari
(74) *Attorney, Agent, or Firm* — Muncy, Geissler, Olds & Lowe, P.C.

(57) ABSTRACT

A toilet system having a toilet device with a toilet seat and electricity-using equipment such as an electronic component unit; a power supplying device that is disposed behind a wall and that has a power supply coil by which power is supplied; and a power receiving device that has a power receiving coil built into the toilet seat, that has a resonance frequency with respect to the power supplying device set, and that supplies power received from the power supplying device by way of magnetic resonance to the electricity-using equipment such as the electronic component unit.

4 Claims, 11 Drawing Sheets

(51) Int. Cl.
*H02J 50/12* (2016.01)
*H02J 5/00* (2016.01)

(56) References Cited

U.S. PATENT DOCUMENTS

2014/0084698 A1* 3/2014 Asanuma ................ H01F 38/14
307/104
2017/0054330 A1* 2/2017 You ......................... H01F 38/14

FOREIGN PATENT DOCUMENTS

| | | | |
|---|---|---|---|
| JP | 2015-083148 A | 4/2015 | |
| JP | 2015-119577 A | 6/2015 | |
| JP | 2015119577 A * | 6/2015 | |
| WO | WO-2010053011 A1 * | 5/2010 | ........... A47K 13/305 |
| WO | WO 2012/120744 A | 9/2012 | |

* cited by examiner

TOILET SYSTEM

TECHNICAL FIELD

The present invention relates to a toilet system that allows power to be supplied to electricity-using equipment for a toilet device.

BACKGROUND ART

In the related art, a toilet is known that is provided with power-operated electricity-using equipment such as a heater and a shower toilet. This type of toilet is disclosed in, for example, Patent Document 1. Described in FIG. 9 of Patent Document 1 is a configuration in which a contactless power supply unit is disposed on the upper surface of a toilet main body and a contactless power receiving unit and a heater are disposed on a toilet seat, which is an example of a toilet in which a heater is heated by the power that is supplied from a contactless power supply unit to a contactless power receiving unit. In addition, Patent Document 2 is an example of what discloses a technique relating to this type of contactless power supply.

Patent Document 1: Japanese Unexamined Patent Application, Publication No. 2015-83148
Patent Document 2: Japanese Unexamined Patent Application, Publication No. 2012-75304

DISCLOSURE OF THE INVENTION

Problems to be Solved by the Invention

In some cases, electronic equipment needs to be added to an existing toilet device. In this regard, in the configuration that is disclosed in Patent Document 1, the entire toilet part should be replaced and wiring is required for power supply to the contactless power supply unit of the toilet. Although a power receiving coil being disposed on a desk and power supply being performed via a relay coil from a floor are disclosed in FIG. 10 and so on of Patent Document 2, the waterproofness of the power receiving coil, floor piping, and so on also should be taken into account for electricity to be supplied to electricity-using equipment for a toilet, and thus the related art has room for improvement in realizing a configuration that allows power to be supplied externally to electricity-using equipment for a toilet device.

An object of the present invention is to provide a toilet system that allows power to be supplied externally to electricity-using equipment for a toilet device without complicated management of wiring.

Means for Solving the Problems

The present invention relates to a toilet system (such as a toilet system 1, 201, 601, 701 (described later)) including a toilet device (such as a toilet device 10 (described later)) that has a toilet seat (such as a toilet seat 12 (described later)) and electricity-using equipment (such as a heater 15, an electronic component unit 50, a motor 55, a sensor 56, and a human sensor 57 (described later)), a power supplying device (such as a power supplying device 30, 730 (described later)) that is disposed on or behind a building material (such as a wall 3 and a floor 2 (described later)) and that has a power supply coil (such as a power supply coil 31, 731 (described later)) by which power is supplied, and a power receiving device (such as a power receiving device 60, 260, 360, 460, 560 (described later)) that has a power receiving coil (such as a power receiving coil 61, 561 (described later)) built into the toilet seat, that has a resonance frequency with respect to the power supplying device set, and that supplies power received from the power supplying device by way of magnetic resonance to the electricity-using equipment.

Preferably, a shield material (such as a heat transfer sheet 17 (described later)) made of a metal material is disposed above the power receiving coil in the toilet seat.

Preferably, the power supply coil is configured such that an annular state can be released by a connector (such as a first member side connector 83 and a second member side connector 84 (described later)).

Preferably, the toilet system includes a relay resonator (such as a relay resonator 40, 40a, 40b, 640 (described later)) that has a relay coil (such as a relay coil 80, 80a, 80b, 680 (described later)) and that has a resonance frequency with respect to the power supplying device set, in which the power receiving device receives power from the power supplying device via the relay resonator by way of magnetic resonance.

Preferably, the relay coil is configured such that an annular state can be released by a connector (such as the first member side connector 83 and the second member side connector 84 (described later)).

Preferably, the toilet device further has a power storage element storing power supplied from the power receiving device and the power stored in the power storage element is supplied to the electricity-using equipment.

Effects of the Invention

According to the present invention, a toilet system that allows power to be supplied externally to electricity-using equipment for a toilet device without complicated management of wiring can be provided.

PREFERRED MODE FOR CARRYING OUT THE INVENTION

Hereinafter, preferred embodiments of the present invention will be described with reference to accompanying drawings.

First Embodiment

Figure 1:
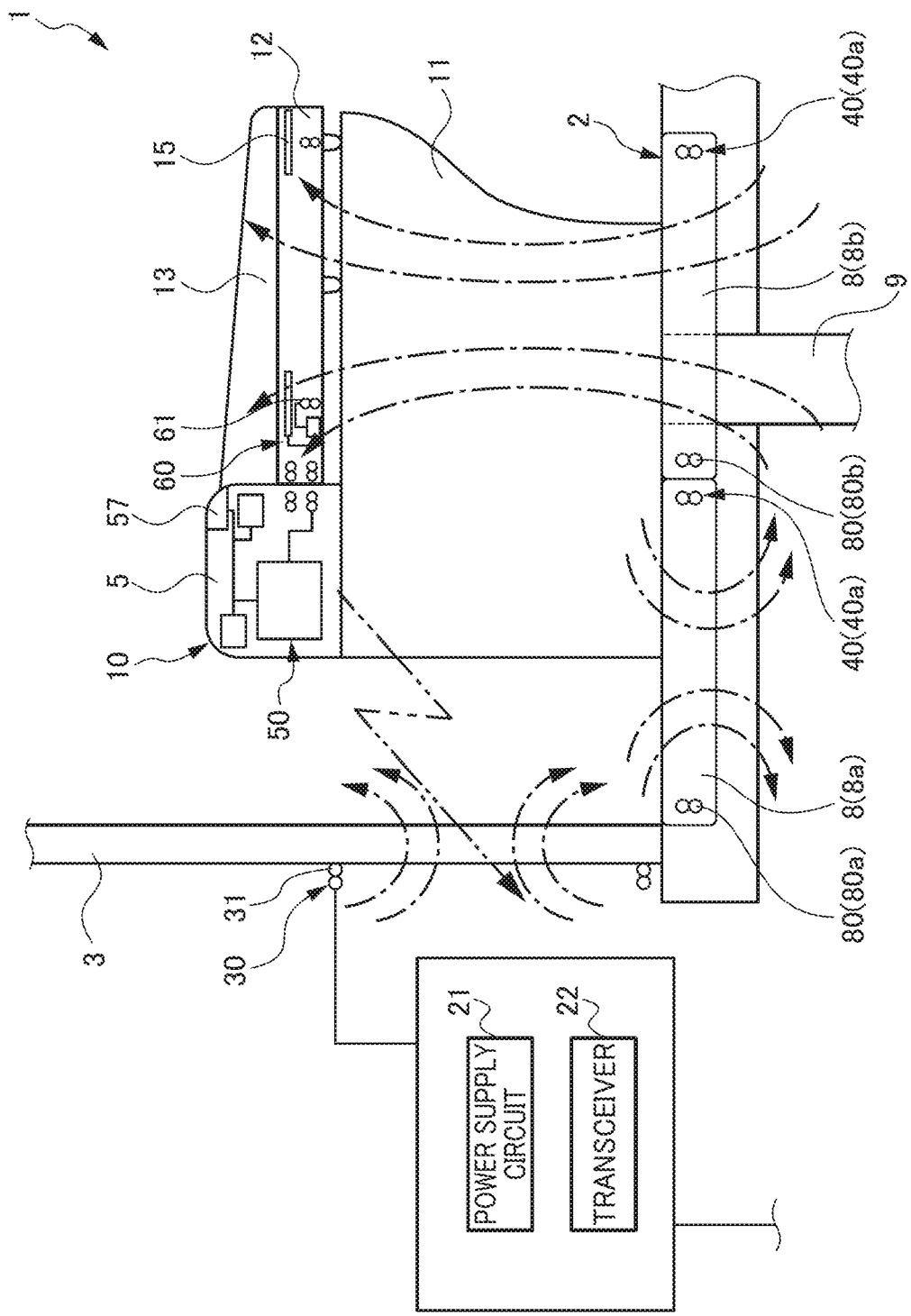
FIG. 1 is a schematic diagram illustrating a toilet system according to an embodiment of the present invention.

FIG. 1 is a schematic diagram illustrating a toilet system 1 according to a first embodiment of the present invention. As illustrated in FIG. 1, the toilet system 1 according to the present embodiment supplies power from the outside to a toilet device 10 by contactless power supply.

Firstly, the toilet device 10 will be outlined. The toilet device 10 according to the present embodiment is provided with a toilet 11, a toilet seat 12, a toilet lid 13, and a functional unit 5.

The toilet 11 is a so-called Western-style toilet that can be used by a user sitting thereon when necessary and is made of a ceramic material passing magnetism. The toilet 11 is installed on a floor 2, and a drain pipe 9 made of a resin material is connected to the lower portion of the toilet 11.

The toilet seat 12 is a part attached to the front side of the toilet 11 and has a seat surface on which a user sits. The toilet seat 12 according to the present embodiment has a hollow inner portion and is provided with, for example, a heater 15 warming the toilet seat 12 by electric heat and a power receiving coil 61 of a power receiving device 60 (described later).

The toilet seat 12 according to the present embodiment is configured to be detachable with respect to the toilet 11 and can be easily cleaned and replaced.

The toilet lid 13 is a lid covering the opening of the toilet 11 and is pivotably supported by the functional unit 5 placed on the rear upper surface of the toilet 11.

The functional unit 5 is configured by an electronic component unit 50 or the like being accommodated in a casing, and the electronic component unit 50 executes various functions such as a shower toilet function, washing, warming of the toilet seat 12, and opening and closing operations for the toilet seat 12 and the toilet lid 13.

The toilet system 1 according to the first embodiment supplies power from a power supply circuit 21 to the functional unit 5 of the toilet device 10 via a power supplying device 30, a plurality of relay resonators 40, and the power receiving device 60 by using magnetic resonance. Each of the power supplying device 30, the plurality of relay resonators 40, and the power receiving device 60 is provided with a resonator in which the shape of a coil, the capacity of a capacitor, and so on are set such that resonance frequencies match. A Litz wire constitutes the coil. The shapes of the coils and so on may be identical or different. Each configuration will be described below.

The power supply circuit 21 is disposed behind a wall 3. The power supply circuit 21 is connected to an external power source (not illustrated) and is configured to be switchable between an ON state where power is supplied to the power supplying device 30 and an OFF state where the power supply is stopped.

A power supply side transceiver 22 performing communication with the functional unit 5 is connected to the power supply circuit 21. The power supply circuit 21 switches between ON and OFF based on a signal from the power supply side transceiver 22.

The power supplying device 30 is a power supply side LC resonance circuit including a power supply coil 31 and a resonance capacitor (not illustrated). Once power is supplied to the power supplying device 30 through the power supply circuit 21, power is sent to the relay resonator 40, which is disposed beneath the floor 2 on the outside of the wall 3, by way of magnetic resonance.

The relay resonator 40 is embedded in a tile 8 installed beneath the floor 2. A plurality of types of relay coils 80 are used in the present embodiment, and the relay coils 80 are divided into a relay coil 80a embedded in a tile 8a pasted to the ordinary floor 2 and a divided relay coil 80b embedded in a divided tile 8b pasted in a location where the drain pipe 9 is installed.

Figure 2:
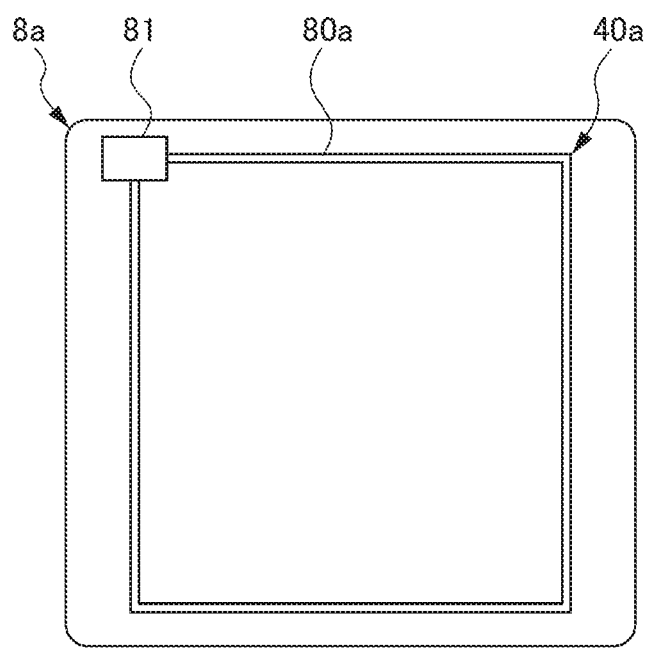
FIG. 2 is a diagram illustrating an undivided tile where a relay resonator according to a first embodiment is disposed.

FIG. 2 is a diagram illustrating the undivided tile 8a where the relay resonator 40 according to the first embodiment is disposed. As illustrated in FIG. 2, a relay resonator 40a incorporated into the undivided tile 8a is an LC circuit that has the relay coil 80a bent in a rectangular frame shape and a resonance capacitor 81 connected to the relay coil 80a. The entire relay resonator 40a including the relay coil 80a and the resonance capacitor 81 is incorporated inside the tile 8a.

Figure 3:
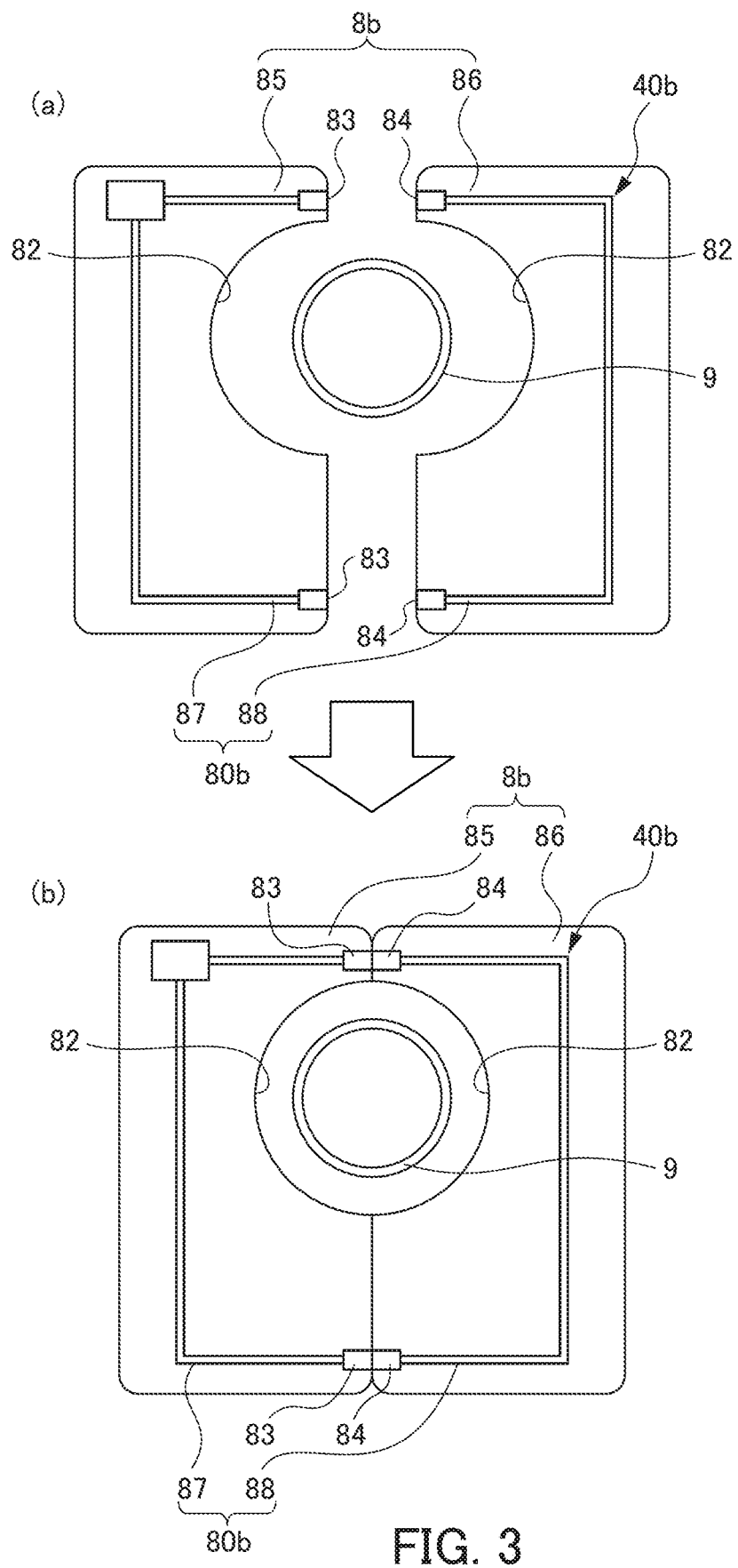
FIG. 3 is a diagram illustrating a divided tile where the relay resonator according to the first embodiment is disposed.

FIG. 3(a) is a diagram illustrating how the divided tile 8b where a relay resonator 40b according to the first embodiment is disposed is divided, and FIG. 3(b) is a diagram illustrating how the divided tile 8b is joined. As illustrated in FIG. 3(a), the divided tile 8b is configured to be divisible into a first member 85 and a second member 86. A notch portion 82 for avoiding interference with the drain pipe 9 after installation beneath the floor 2 is formed in each of the first member 85 and the second member 86.

The first member 85 is provided with a first relay coil 87 having a substantially U shape by the relay coil 80b being divided in half, the resonance capacitor 81 connected to the first relay coil 87, and a first member side connector 83 disposed in each of the two end portions of the first relay coil 87.

The second member 86 is provided with a second relay coil 88 having a substantially U shape by the relay coil 80b being divided in half and a second member side connector 84 disposed in each of the two end portions of the second relay coil 88.

The first member side connector 83 and the second member side connector 84 are configured to be connectable, and each of the first member side connector 83 and the second member side connector 84 is waterproof.

As illustrated in FIG. 3(b), the first member 85 and the second member 86 are disposed such that the drain pipe 9 is put inside the notch portion 82, and the sealing work is performed by the first member side connector 83 and the second member side connector 84 being connected. As a result, the relay resonator 40b can be disposed by the divided tile 8b being used even in a location where an interfering object such as the drain pipe 9 is present.

As illustrated in FIG. 1, the axial direction of the power supply coil 31 of the power supplying device 30 and the axial direction of the relay coil 80a of the relay resonator 40a have an orthogonal relationship. Even in this case, power can be relayed by a magnetic resonance method for causing magnetic field coupling between the power supply coil 31 of the power supplying device 30 and the relay coil 80a of the relay resonator 40a.

The power relayed to the relay resonator 40a is sent to the relay coil 80b of the relay resonator 40b embedded in the adjacent divided tile 8b, and then is sent to the power receiving device 60 positioned above the relay coil 80b.

The power receiving device 60 is a power receiving side LC resonance circuit that has the power receiving coil 61 and a resonance capacitor (not illustrated) and sends power to the electronic component unit 50 as electricity-using equipment by converting a high frequency generated by way of magnetic resonance into a direct current.

Figure 4:
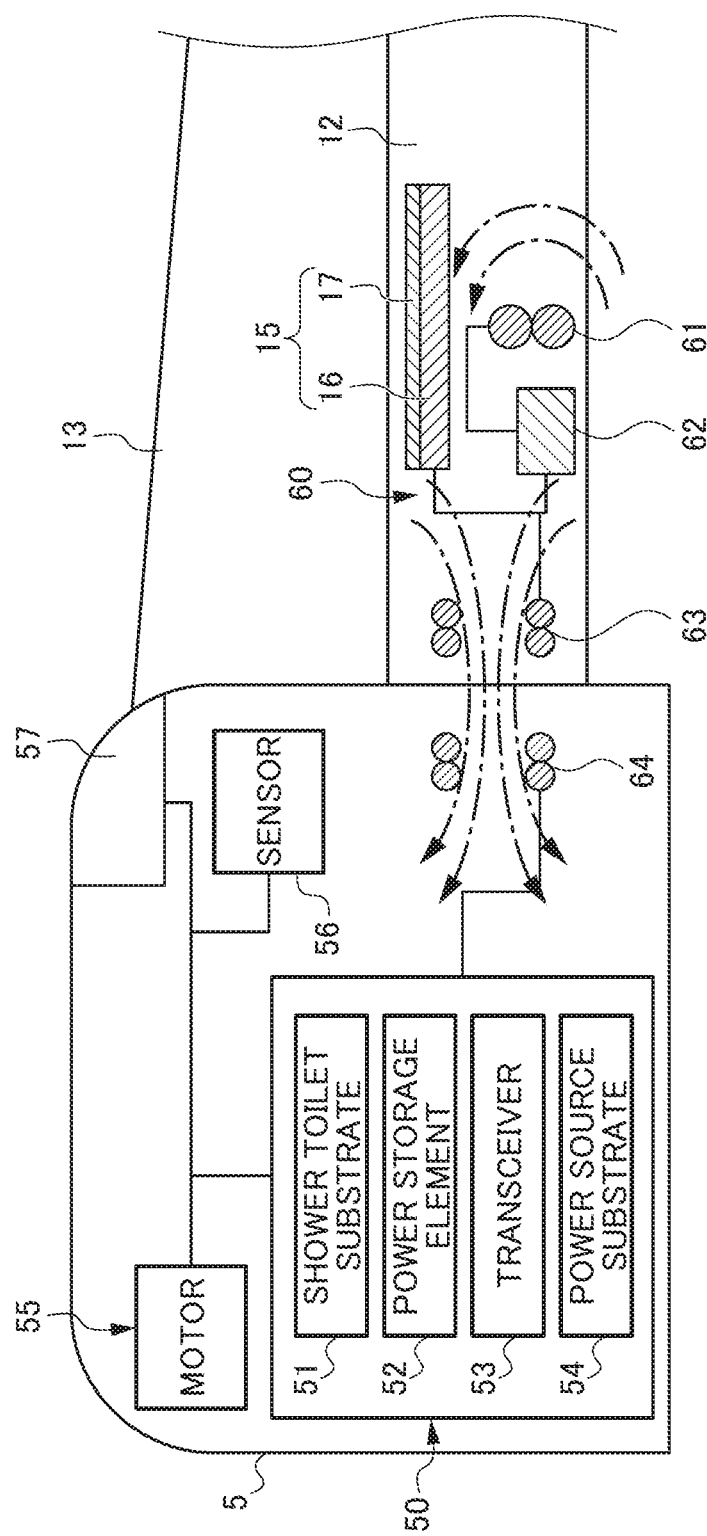
FIG. 4 is a schematic diagram illustrating a power receiving device according to the first embodiment and the vicinity thereof.

FIG. 4 is a schematic diagram illustrating the power receiving device 60 according to the first embodiment and the vicinity thereof. As illustrated in FIG. 4, the power receiving device 60 is provided with a impedance circuit 62 and a toilet seat side transmission coil 63 disposed on the toilet seat 12 side and a functional unit side receiving coil 64 disposed on the functional unit 5 side.

Some of the power that is received by the power receiving coil 61 is sent to the heater 15 through the impedance circuit 62 and used as power warming the heater 15.

The heater 15 is provided with a heating element 16 and a heat transfer sheet 17. The heating element 16 is a member warming the surface of the toilet seat 12 by electric heat. The heat transfer sheet 17 is disposed on the heating element 16 and above the power receiving coil 61. The heat transfer sheet 17 is made of a sheet-shaped and highly heat-conductive metal material such as aluminum foil. Alternatively, a magnetic metal such as ferrite can be used. When a magnetic metal is used, interference between the heater 15 and the power receiving coil 61 can be prevented and power can be sent more efficiently.

Some of the power that is received by the power receiving coil 61 is sent to the toilet seat side transmission coil 63 by contactless power supply, and then is sent from the toilet seat side transmission coil 63 to the functional unit side receiving coil 64.

The power that is supplied to the functional unit side receiving coil 64 is supplied to the electronic component unit 50. The electronic component unit 50 is provided with a shower toilet substrate 51 controlling a shower toilet operation, a power storage element 52 storing the power that is supplied through the functional unit side receiving coil 64, a transceiver 53 performing wireless communication with the power supply side transceiver 22, and a power source substrate 54 performing control relating to a power source of the electronic component unit 50.

Disposed in the inner portion of the functional unit 5 are, for example, a motor 55 as a drive unit realizing a shower toilet function, a sensor 56 as a detection unit detecting the opening and closing state of the toilet lid 13, and a human sensor 57 as a human detection unit detecting the presence of a person using the toilet device 10. The motor 55, the sensor 56, the human sensor 57, and the like are electrically connected to the electronic component unit 50. The present invention is not limited to the configuration illustrated in FIG. 4, and various types of electricity-using equipment, such as a drive mechanism (not illustrated) opening and closing the toilet seat 12 and the toilet lid 13, are disposed in the functional unit 5.

The power supply flow according to the first embodiment will be described below. As indicated by a chain line in FIG. 1, power from a power source is supplied to the power supplying device 30 once the power supply circuit 21 disposed outside the wall 3 is turned ON. The power is sequentially relayed to the power supply coil 31, the relay coil 80a of the relay resonator 40a, the relay coil 80b of the relay resonator 40b, and the power receiving coil 61 of the power receiving device 60 by way of magnetic resonance.

In the power receiving device 60, the power received by the power receiving coil 61 is used for heating of the heater 15 and sent to the functional unit side receiving coil 64 through the toilet seat side transmission coil 63, and then the power is stored in the power storage element 52 of the electronic component unit 50. In the power storage element 52, the power is stored while the power supply circuit 21 is ON, and the power is supplied from the power storage element 52 to power-using equipment such as the motor 55 and the sensor 56 at an appropriate timing.

An ON/OFF timing of the power supply circuit 21 will be described below. In the present embodiment, ON/OFF of the power supply circuit 21 is switched based on a control signal that the power supply side transceiver 22 receives from the transceiver 53 of the functional unit 5. The power supply circuit 21 performs power supply or power supply stop based on, for example, opening and closing information from the sensor 56 regarding the toilet lid 13, information from the human sensor 57 regarding the presence or absence of a person, and equipment information regarding the temperature of the heater 15, and so on.

In a case where the power supply is performed based on the opening and closing information from the sensor 56 regarding the toilet lid 13, the power supply is controlled such that the power supply is performed with the power supply circuit 21 ON in a state where the toilet lid 13 is closed and the power supply is stopped with the power supply circuit 21 OFF in a state where the toilet lid 13 is open.

In a case where the power supply is performed based on the presence or absence of a person detected by the human sensor 57, the power supply is controlled such that the power supply is performed with the power supply circuit 21 ON when the presence of a person is not detected and the power supply is stopped with the power supply circuit 21 OFF when the presence of a person is detected.

The power storage element 52 performs power storage when the toilet device 10 stands by without being used, and thus various operations of the functional unit 5 are performed without delay even when the power supply is stopped during the use of the toilet device 10.

In the present embodiment, a signal for stopping power supply is transmitted from the transceiver 53 to the power supply side transceiver 22, such that the power supply circuit 21 is turned OFF, once the heater 15 reaches a predetermined warming stop temperature. The power supply circuit 21 stops power supply based on the signal received by the power supply side transceiver 22. Once a predetermined warming initiation temperature is reached after the power supply stop, a signal for stopping power supply is transmitted from the transceiver 53 to the power supply side transceiver 22 such that the power supply circuit 21 is turned ON.

No power supply is performed during the use by a person both in a case where the power supply is based on the opening and closing state of the toilet lid 13 and in a case where the power supply is based on the presence or absence of a person. Accordingly, no human body is affected by the power supply (prevention of human body exposure).

As described above, the toilet seat 12 is warmed by the heater 15 operated by power supplied during standby, and thus the surface temperature of the toilet lid 13 can be maintained with sufficient warmth when the toilet device 10 is used. Accordingly, the heater function of the toilet device 10 can be operated more safely and efficient power supply can be performed with unnecessary power supply avoided.

Preferably, the electronic component unit 50 is configured to transmit a stop signal to the power supply side transceiver 22 through the transceiver 53, such that the power supply of the power supply circuit 21 is stopped, once predetermined or more power is stored in the power storage element 52. As a result, more-than-necessary power supply to the power storage element 52 is not performed and the power supply is performed even more efficiently.

The embodiment described above has the following effects. In other words, the toilet system 1 includes the toilet device 10 that has the toilet seat 12 and electricity-using equipment such as the electronic component unit 50, the power supplying device 30 that is disposed behind the wall 3 and that has the power supply coil 31 by which power is supplied, and the power receiving device 60 that has the power receiving coil 61 built into the toilet seat 12, that has a resonance frequency with respect to the power supplying device 30 set, and that supplies power received from the power supplying device 30 by way of magnetic resonance to the electricity-using equipment such as the electronic component unit 50.

As a result, contactless power supply can be performed by way of magnetic resonance and without the necessity of complicated wiring management even in the toilet device 10 separated from the wall 3 as a building material. A power supply function for the electricity-using equipment of the functional unit 5 can be implemented for the toilet system through simple construction. In addition, replacement of the toilet seat 12 is facilitated based on the configuration in which the power receiving coil 61 required for the power receiving device 60 is built into the toilet seat 12.

In addition, in the toilet seat 12 according to the present embodiment, the heat transfer sheet 17 made of a metal material is disposed above the power receiving coil 61.

The magnetic field that leaks out from the power receiving coil 61 can be shielded by the heat transfer sheet 17 as a sealing material, and leakage field generation outside the toilet seat 12 can be effectively prevented. In the present embodiment, a shield material functions also as the heat transfer sheet 17 of the heater 15, and thus a shield effect-realizing configuration can be organized in a simple manner.

In addition, the toilet system 1 according to the first embodiment is provided with the relay resonators 40a and 40b that have the relay coils 80a and 80b and have a resonance frequency with respect to the power supplying device 30 set, and the power receiving device 60 receives power from the power supplying device 30 via the relay resonators 40a and 40b by way of magnetic resonance.

As a result, the degree of freedom in terms of disposition increases based on the use of the relay resonator 40 and use in various layouts of the toilet system 1 is possible.

In addition, the relay coil 80b according to the present embodiment is configured such that an annular state can be released by the first member side connector 83 and the second member side connector 84.

As a result, the relay coil 80b can be disposed in a divided manner even in a configuration in which power should be supplied with the drain pipe 9 or the like avoided as in the toilet device 10. Accordingly, various layouts can be responded to, and a power supply path for power supply to the toilet seat 12 can be implemented with ease even in a case where the drain pipe 9 cannot be avoided as in the case of reform or the like.

The toilet device 10 further includes the power storage element 52 storing the power that is supplied from the power receiving device 60, and the power stored in the power storage element 52 is supplied to the electricity-using equipment such as the motor 55 and the sensor 56.

As a result, the power temporarily stored in the power storage element 52 is used, and thus power can be stably supplied even in the event of a change in impedance attributable to, for example, disturbance and a movement of the toilet seat 12. In addition, the power of the power storage element 52 can be used even when power supply is stopped, and thus the power supply can be stopped depending on employment situations regarding the toilet device 10 and the power supply control can be flexibly performed.

In addition, the toilet system 1 according to the first embodiment is configured as follows. The toilet system 1 further includes the power supply circuit 21 performing power supply and power supply stop and the power supply side transceiver 22 receiving a signal including the opening and closing information regarding the toilet lid 13 transmitted from the electronic component unit (electricity-using equipment) 50 and the temperature information (equipment information) of the heater 15 or the sensor 56 (device indicating information regarding the use of the toilet device 10), and the power supply circuit 21 switches between the power supply and the power supply stop based on the equipment information or the information regarding the use of the toilet device 10 included in the signal received by the transceiver 22.

As a result, the power supply can be stopped when a person uses the toilet device 10, and thus human body exposure attributable to the power supply of the toilet system 1 can be effectively prevented.

In addition, in the first embodiment, the tile 8 is adopted as a building material in which the relay resonator 40 is embedded, and thus the relay resonator 40 is protected inside the tile 8 and does not affect the appearance. In addition, by the use of the magnetic resonance, the tile 8 in which the relay resonator 40 is embedded can be disposed in a shifted or branching manner in accordance with installation location situations.

Hereinafter, embodiments in which the present invention is applied to the functional unit 5 of the toilet device 10 as in the first embodiment will be described one after another. In the following description of the embodiments, the same reference numerals will be used to refer to already-described similar configurations so that the same description does not have to be repeated.

Second Embodiment

Figure 5:
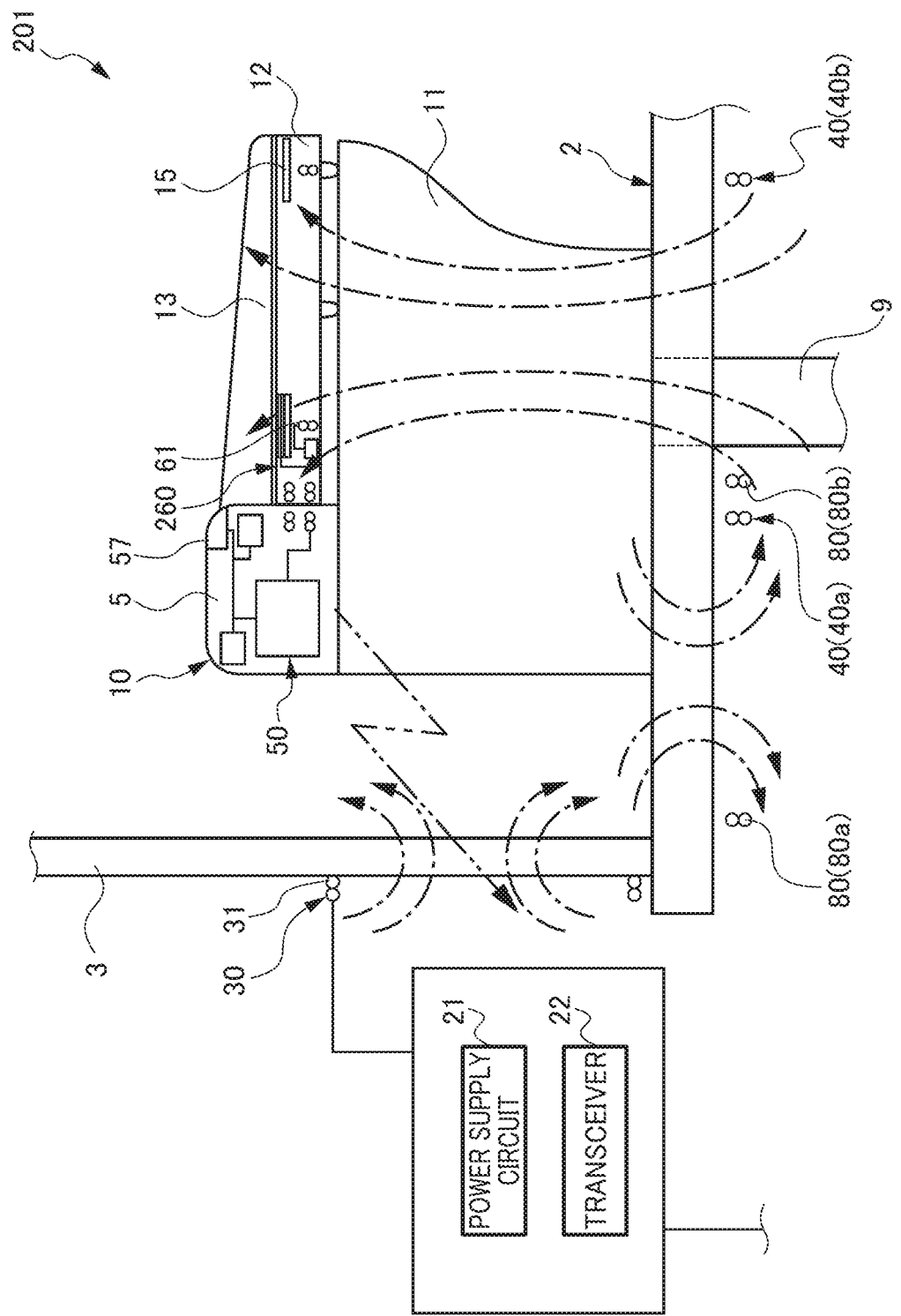
FIG. 5 is a schematic diagram illustrating a toilet system according to a second embodiment.

FIG. 5 is a schematic diagram illustrating a toilet system 201 according to a second embodiment. The second embodiment differs from the first embodiment in terms of the configuration of the power supply path from the power supply circuit 21 to the functional unit 5. As illustrated in FIG. 5, the relay resonator 40 is disposed below the floor 2 instead of the tile 8. Even in a case where the relay resonator 40 is disposed below the floor 2 as described above, power can be supplied to the functional unit 5 positioned above the floor 2 by magnetic resonance being used.

Also in the second embodiment, the divisible relay coil 80b is used in the location where the drain pipe 9 is disposed. After the relay coil 80b is divided into the first relay coil 87 and the second relay coil 88, the first member side connector 83 of the first relay coil 87 and the second member side connector 84 of the second relay coil 88 are connected by a connector at a position surrounding the drain pipe 9.

In addition, the toilet device 10 according to the second embodiment is provided with a toilet lid side shield material 220 including a magnetism-shielding member made of a metal material or the like. The toilet lid side shield material 220 is disposed on the inside surface of the toilet lid 13 and at a position corresponding to the surface of the toilet seat 12 in a state where the toilet lid 13 is closed. As a result, a leakage field can be even more effectively shielded also by the toilet lid side shield material 220 even in a state where the toilet lid 13 is closed and power supply is performed.

Figure 6:
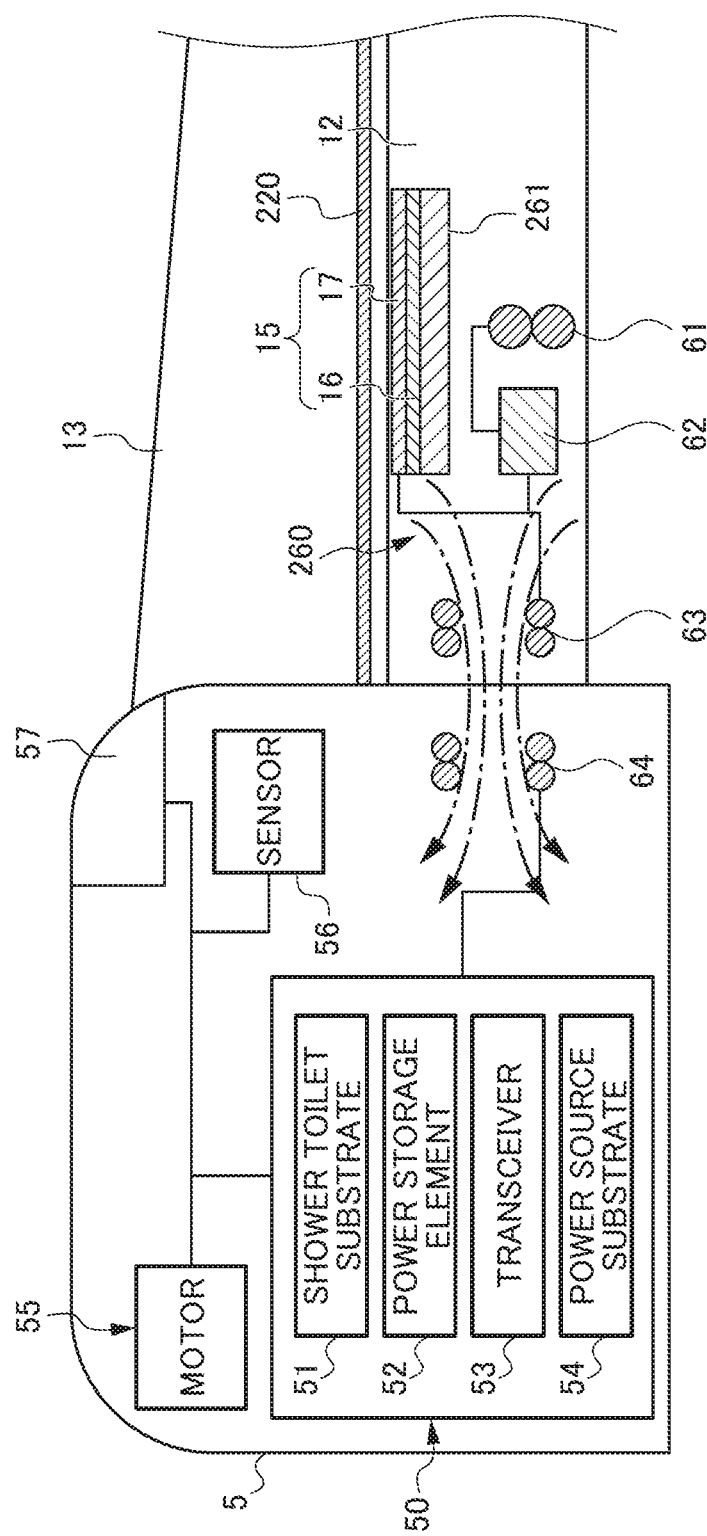
FIG. 6 is a schematic diagram illustrating a power receiving device according to the second embodiment and the vicinity thereof.

FIG. 6 is a schematic diagram illustrating the configuration of a power receiving device 260 according to the second embodiment. As illustrated in FIG. 6, the power receiving device 260 according to the second embodiment further includes a heat storage material 261 disposed between the heater 15 and the power receiving coil 61. The heat storage material 261 according to the second embodiment is in contact with the heater 15. By the heat storage material 261 being disposed, the temperature of the heater 15 can be maintained even in a state where no power is supplied to the heating element 16 of the heater 15.

Also in the configuration of the second embodiment described above, power supply to the toilet device 10 from the outside can be performed without management of wiring by contactless power supply using magnetic resonance.

Third Embodiment

Figure 7:
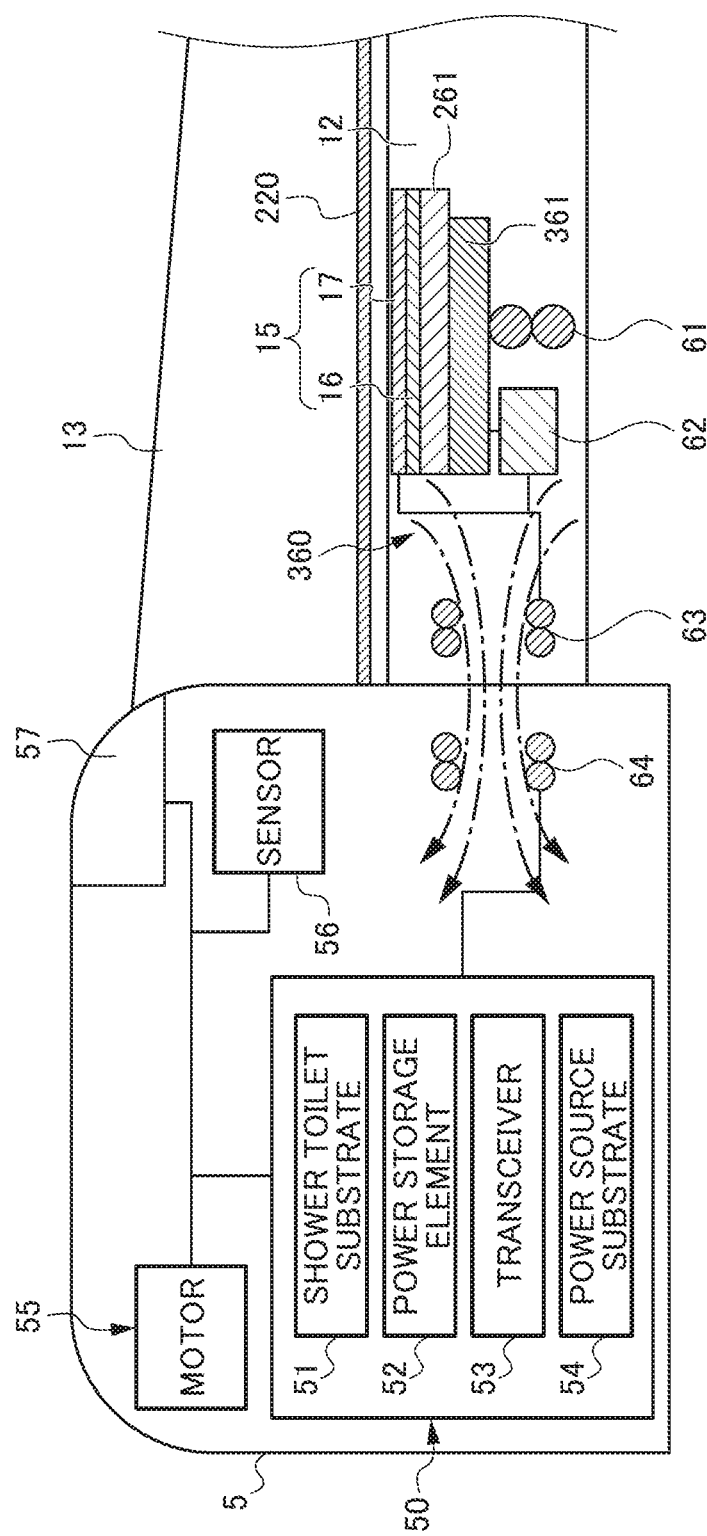
FIG. 7 is a schematic diagram illustrating a power receiving device according to a third embodiment and the vicinity thereof.

FIG. 7 is a schematic diagram illustrating a power receiving device 360 according to a third embodiment and the vicinity thereof. As illustrated in FIG. 7, in the third embodiment, a heat insulating material 361 is disposed in addition to the configuration of the second embodiment. The heat insulating material is disposed on the lower side of the heat storage material 261. By the heat insulating material 361 being disposed, heat storage performance can be improved even more.

Fourth Embodiment

Figure 8:
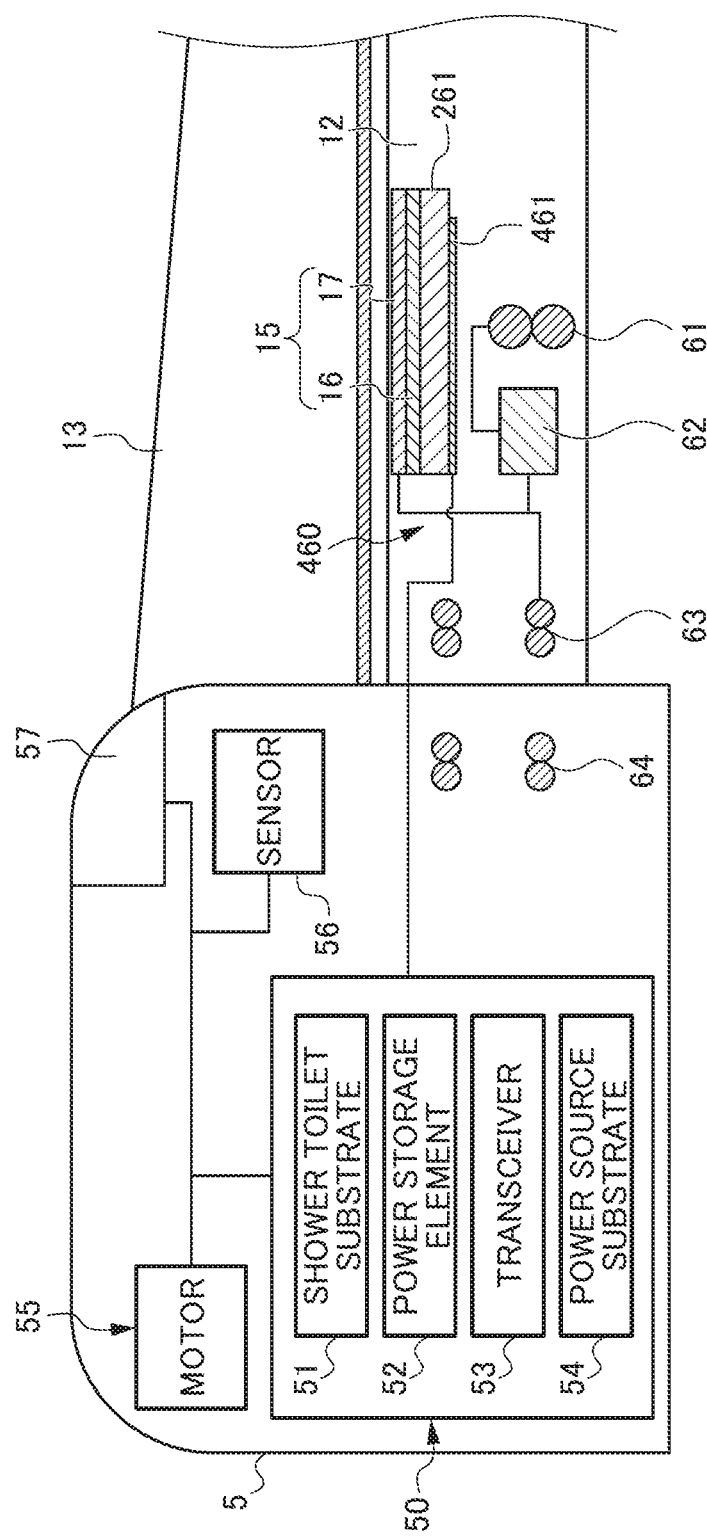
FIG. 8 is a schematic diagram illustrating a power receiving device according to a fourth embodiment and the vicinity thereof.

FIG. 8 is a schematic diagram illustrating a power receiving device 460 according to a fourth embodiment and the vicinity thereof. As illustrated in FIG. 8, in the fourth embodiment, a thermoelectric element 461 is disposed in addition to the configuration of the second form. The thermoelectric element 461 is electrically connected to the electronic component unit 50. The thermoelectric element 461 according to the present embodiment is a Seebeck effect-using element generating power from the difference between the temperature of the heat storage material 261 heated by the heater 15 and the temperature (ambient temperature) of the inner portion of the toilet seat 12. The power generated by the thermoelectric element 461 is transmitted to the power storage element 52 of the electronic component unit 50.

Fifth Embodiment

Figure 9:
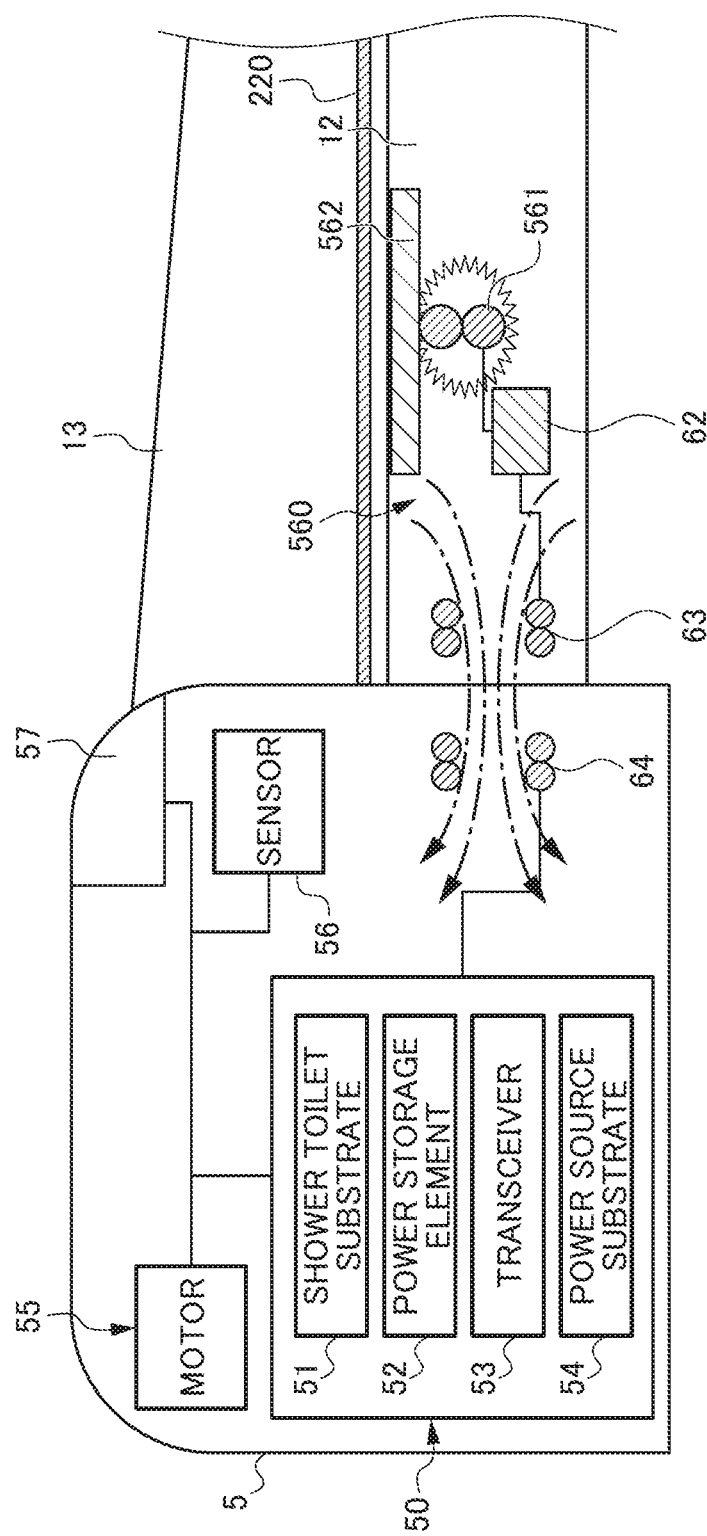
FIG. 9 is a schematic diagram illustrating a power receiving device according to a fifth embodiment and the vicinity thereof.

FIG. 9 is a schematic diagram illustrating a power receiving device 560 according to a fifth embodiment and the vicinity thereof. As illustrated in FIG. 9, in the fifth embodiment, a power receiving coil 561 functions as a heating element of a heater. A shield heat storage material 562 is disposed on the power receiving coil 561 and is configured to store the heat of the power receiving coil 561 and transmit the heat to the surface of the toilet seat 12. Preferably, the power receiving coil 561 uses a material capable of sufficiently heating the shield heat storage material 562 by heat generation resulting from energization such as an iron wire and a thin copper wire. By means of this configuration, both a simplified heater configuration and a heat countermeasure of the power receiving coil 561 can be achieved.

Sixth Embodiment

Figure 10:
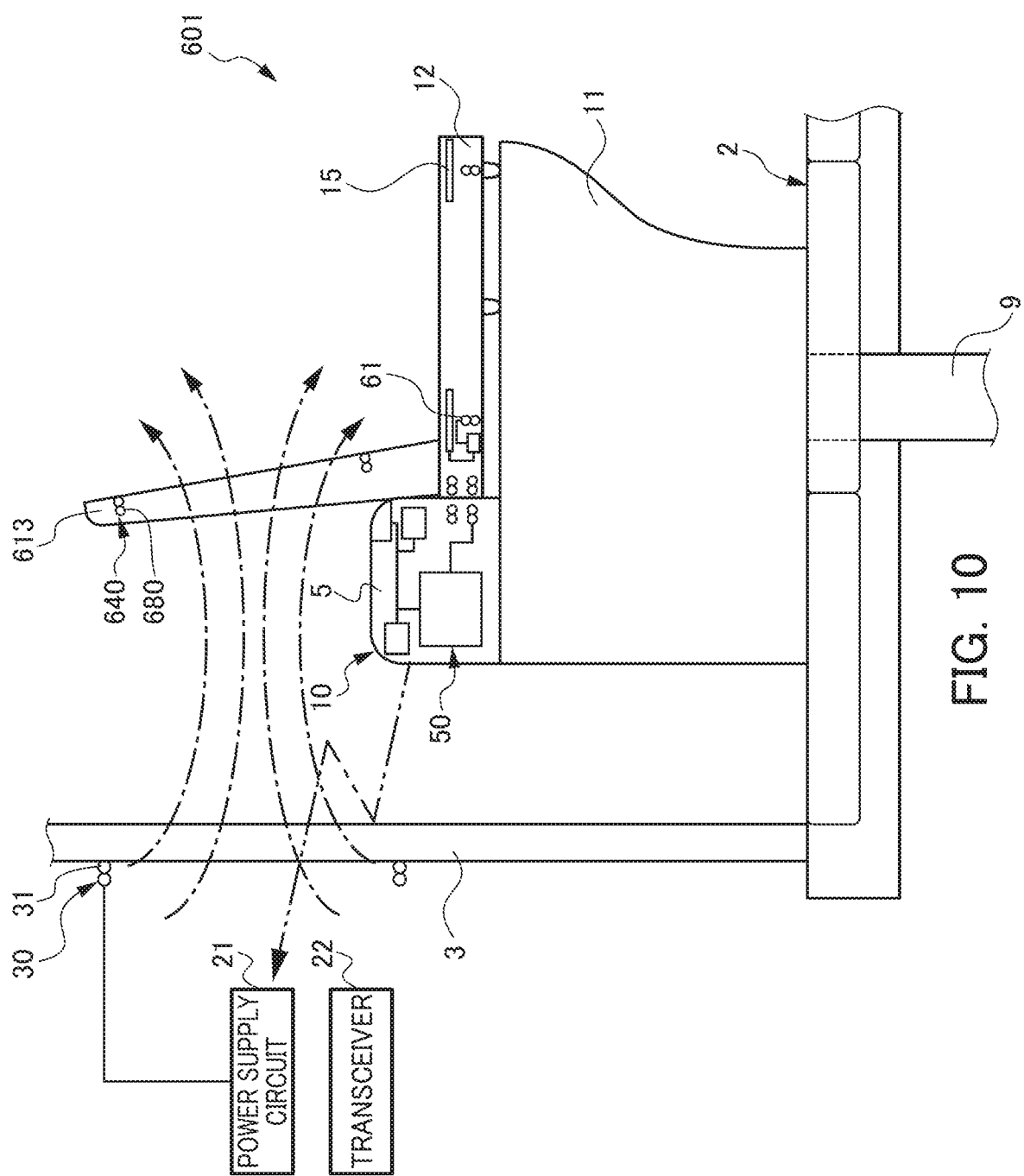
FIG. 10 is a schematic diagram illustrating a toilet system according to a sixth embodiment.

FIG. 10 is a schematic diagram illustrating a toilet system 601 according to a sixth embodiment. As illustrated in FIG. 10, in the sixth embodiment, a relay resonator 640 is built into a toilet lid 613. The relay resonator 640 is an LC resonance circuit that has a relay coil 680 and a resonance capacitor (not illustrated). By magnetic resonance being used, power can be continuously supplied to the power receiving device 60 even in the event of a change in the position and angle of the toilet lid 613 resulting from pivoting caused by opening and closing.

Seventh Embodiment

Figure 11:
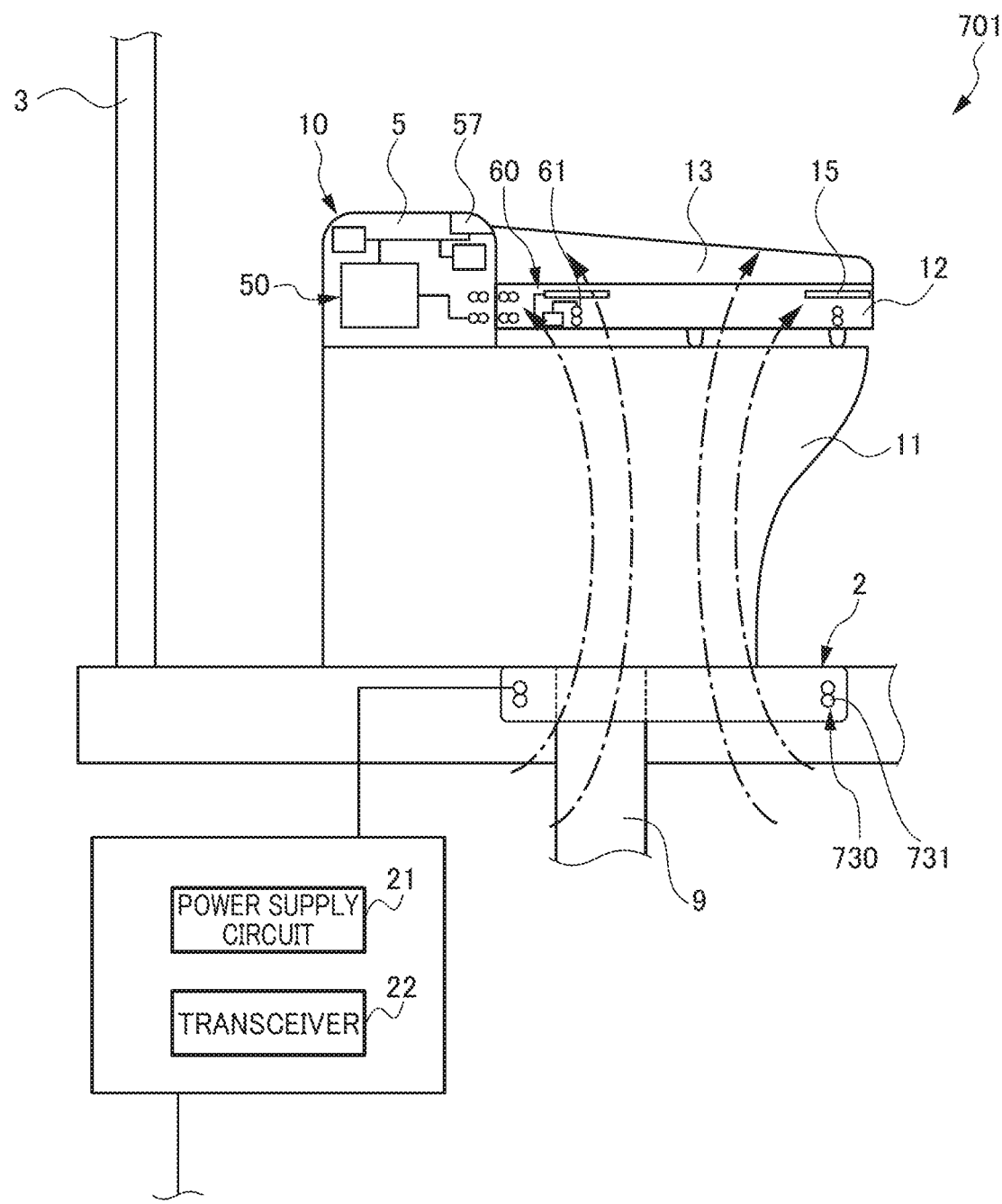
FIG. 11 is a schematic diagram illustrating a toilet system according to a seventh embodiment.

FIG. 11 is a schematic diagram illustrating a toilet system 701 according to a seventh embodiment. As illustrated in FIG. 11, in the toilet system 701 according to the seventh embodiment, power is supplied to the power receiving device 60 not via the relay resonator 40 but directly from a power supply coil 731 of a power supplying device 730. The power supply coil 731 of the power supplying device 730 according to the seventh embodiment is disposed inside the floor 2 including a tile. Power from the power supply circuit 21 is supplied to the power supply coil 731. Although the power supply circuit 21 and the transceiver 22 are disposed below the floor 2 in FIG. 11 illustrating the seventh embodiment, the power supply circuit 21 and the transceiver 22 may also be disposed on the wall 3 in an alternative configuration.

As in the first embodiment, the power supply coil 731 is configured to be divisible by the first member side connector 83 (not illustrated in FIG. 11) and the second member side connector 84 (not illustrated in FIG. 11). In other words, the power supply coil 731 is configured such that an annular state can be released by the first member side connector 83 and the second member side connector 84. As a result, also in the seventh embodiment, the power supplying device 730 can be disposed without interfering with the drain pipe 9. Depending on the configurations of the floor 2 and the toilet device 10, an undivided power supply coil can be used as the power supply coil 731. The toilet system according to the present invention can be configured to lack a relay resonator as described above.

Although preferred embodiments of the present invention have been described above, the present invention is not limited to the above-described embodiments and can be appropriately modified.

Although the power supplying device 30 is fixed behind the wall 3 in the configurations of the above-described embodiments, the power supplying device 30 may also be disposed behind the floor 2, embedded inside a building material, or disposed on a building material (such as a tile) on the front side of the wall 3 or the floor 2.

EXPLANATION OF REFERENCE NUMERALS 1, 201, 601, 701 Toilet system
2 Floor (building material)
3 Wall (building material)
10 Toilet device
15 Heater (electricity-using equipment)
17 Heat transfer sheet (shield material)

30, 730 Power supplying device
31, 731 Power supply coil
50 Electronic component unit (electricity-using equipment)
55 Motor (electricity-using equipment)
56 Sensor (electricity-using equipment)
60, 260, 360, 460, 560 Power receiving device
61, 561 Power receiving coil
40, 40$a$, 40$b$, 640 Relay resonator
80, 80$a$, 80$b$, 680 Relay coil
83 First member side connector (connector)
84 Second member side connector (connector)

The invention claimed is:

1. A toilet system comprising:

a toilet device that has a toilet, a toilet seat, a toilet lid, and a functional unit, wherein the toilet being disposed on a floor around a drain pipe, the toilet seat being disposed on upper-front side of the toilet, the toilet lid being disposed on upper side of the toilet seat, and wherein the functional unit accommodates electricity-using equipment for heating the toilet seat and for opening and closing the toilet lid and/or the toilet seat;

a power supplying device that is disposed on or behind a building material and that has a power supply coil by which power is supplied;

a power receiving device that has a power receiving coil built into the toilet seat, that has a resonance frequency with respect to the power supplying device set, and that supplies power received from the power supplying device by way of magnetic resonance to the electricity-using equipment; and a relay resonator that is disposed around the toilet and that has a relay coil for relaying power supplied from the power supplying device to the power receiving device, wherein the relay resonator transmits the power supplied from the power supplying device to the power receiving coil via the relay coil, wherein the relay resonator is provided with a connector capable of connecting and releasing relay coils in and from an annular shape without interfering the drain pipe.

2. The toilet system according to claim 1, wherein:

the toilet device further has a power storage element storing power supplied from the power receiving device; and the power stored in the power storage element is supplied to the electricity-using equipment.

3. The toilet system according to claim 1, wherein the relay coil and the connector are embedded in a tile.

4. The toilet system according to claim 3, wherein the tile is a pair of tiles including a first member and a second member, wherein the first member and the second member have a notch portion respectively in order to avoid interference with the drain pipe when the tile is installed, and wherein the relay coil and the connector is embedded into the first member and the second member respectively, and wherein the first member and the second member act as the relay resonator when the first member and the second member are combined in a manner that the notch portion of the first member and the notch portion of the second member face each other.

* * * * *